(12) United States Patent
Jang (10) Patent No.: US 6,616,351 B1
(45) Date of Patent: Sep. 9, 2003

(54) BIDIRECTIONAL OPTICAL AMPLIFYING APPARATUS AND OPTICAL GAIN CONTROLLING METHOD IN A BIDIRECTIONAL WDM OPTICAL COMMUNICATION NETWORK

(75) Inventor: Jin Hwan Jang, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/417,222

(22) Filed: Oct. 13, 1999

(30) Foreign Application Priority Data

Oct. 13, 1998 (KR) ............................................. 98-42836

(51) Int. Cl.[7] ................................................. H04J 14/02
(52) U.S. Cl. .............................. 398/94; 398/82; 398/92; 398/93
(58) Field of Search ................................. 359/110, 127, 359/177, 341.4, 341.41

(56) References Cited

U.S. PATENT DOCUMENTS

| | | | | |
|---|---|---|---|---|
| 5,812,710 A | * | 9/1998 | Sugaya ........................ | 359/127 |
| 5,907,429 A | * | 5/1999 | Sugata ........................ | 359/160 |
| 5,923,463 A | * | 7/1999 | Hamada ...................... | 359/337 |
| 6,049,413 A | * | 4/2000 | Taylor et al. ................ | 359/161 |
| 6,067,187 A | * | 5/2000 | Onaka et al. ................ | 359/160 |
| 6,072,614 A | * | 6/2000 | Roberts ....................... | 359/110 |
| 6,094,296 A | * | 7/2000 | Kosaka ........................ | 359/124 |
| 6,195,480 B1 | * | 2/2001 | Kosaka et al. ................ | 385/24 |
| 6,307,670 B1 | * | 10/2001 | McNamara ............. | 359/341.33 |

OTHER PUBLICATIONS

J.H. Jang, et al., *Implementation of Automatic Gain Controlled Bidirectional EDFA in WDM Networks*, CLEO/Pacific Rim 99, The Pacific Rim Conference on Lasers and Electro–Optics, Seoul, Korea, Aug. 30–Sep. 3, 1999, pp. 650–651.

* cited by examiner

*Primary Examiner*—Jason Chan
*Assistant Examiner*—David C. Payne
(74) *Attorney, Agent, or Firm*—McKenna, Long & Aldridge LLP (57) ABSTRACT

A bidirectional optical amplifying apparatus-and method of controlling the optical gain in a bidirectional WDM optical communication network includes a bidirectional optical amplifier for amplifying a forward WDM optical input signal and a reverse WDM optical input signal, a measurement means for measuring the total input intensity and the total output intensity of the bidirectional optical amplifier, and a control means for measuring a gain using the total input intensity and the total output intensity, compensating the error between the measured gain and a reference gain, and feedback controlling the bidirectional optical amplifier to uniformly maintain the gain. The measurement means divides a forward optical input signal and a reverse optical input signal, in a constant ratio, respectively, converts the divided optical signal to an electrical signal, and measures total input intensity. The measurement means divides a forward optical output signal and a reverse optical output signal, in a constant ratio, respectively, converts the divided optical signal to an electrical signal, and measures the total output intensity. The control means controls the optical output of a pump laser using the error signal. Accordingly, if a WDM channel is branched or coupled from the optical communication network, the optical gain and gain flatness can be maintained uniformly by measuring the total input and the total output of the bidirectional optical amplifier and automatically controlling the gain, even if the optical input level increases or decreases.

13 Claims, 7 Drawing Sheets

BIDIRECTIONAL OPTICAL AMPLIFYING APPARATUS AND OPTICAL GAIN CONTROLLING METHOD IN A BIDIRECTIONAL WDM OPTICAL COMMUNICATION NETWORK

This application claims the benefit of Korean Patent Application No. 1998-42836, filed on Oct. 13, 1998, which is hereby incorporated by reference.

BACKGROUND OF THE INVENTION

1. Field of the Invention

The present invention relates to a bidirectional optical amplifying apparatus in a bidirectional WDM (wavelength division multiplexing) optical communication network, more particularly to a bidirectional optical amplifying apparatus which uniformly controls optical gain and gain flatness of a WDM channel in a bidirectional optical communication network that allows bidirectional communication using a single mode optical fiber (SMF).

2. Discussion of the Related Art

In general, WDM has been developed for increasing the channel capacity of an optical fiber. A WDM system adopts a plurality of optical signal channels, and a particular wavelength is allocated to each channel. Because each channel may transmit a plurality of information sources by TDM (Time Division Multiplexing), added optical channels increase their capacity in proportion to channels of single channel system. In the transmission end of the WDM system, a number of single channels are created. The single channels are multiplexed as WDM optical signals, then the multipexed WDM optical signals are transmitted through an optical line. At the receiving end, the WDM optical signals are demultiplexed to each channel in order to be transmitted through designated receiver paths. The multiplexed WDM optical signal may be directly amplified through an optical amplifier, for example a doped optical amplifier, at the same time. Such an optical amplifier is very useful for a WDM system in a long distance optical system.

A bidirectional WDM optical communication system is used for transmitting or receiving a plurality of optical signals via an optical fiber. Furthermore, the optical amplifier is a most important element adopted in the bidirectional WDM optical communication system.

Figure 1:
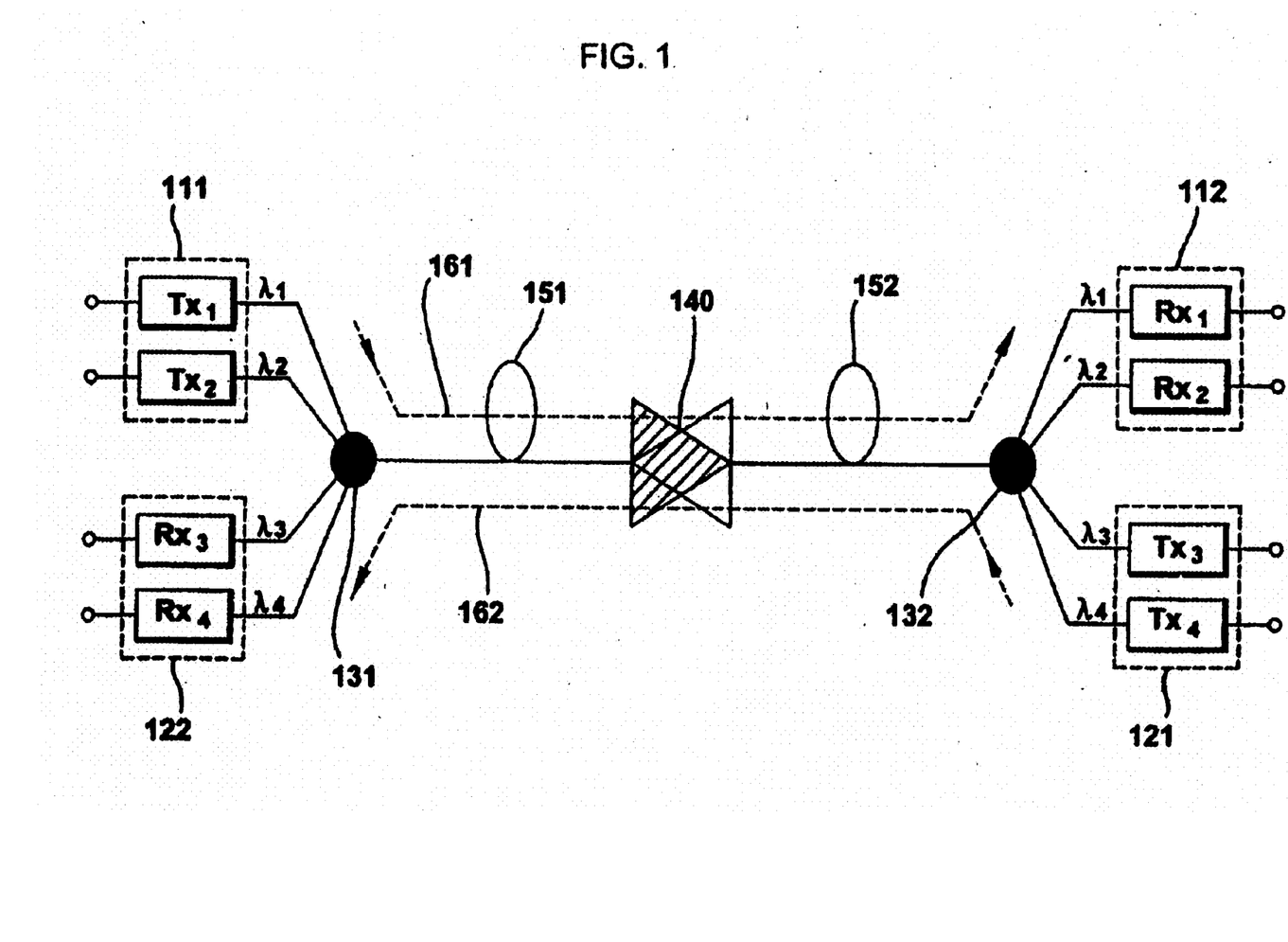
FIG. 1 is a schematic diagram showing a general bidirectional WDM optical transmission system.

FIG. 1 is a schematic diagram showing a general bidirectional WDM optical transmission system.

Referring to FIG. 1, a bidirectional optical amplifier 140 amplifies and transmits channel signals respectively of the forward transmission path 161, which transmits signal from left optical line 151 to right optical line 152, and the reverse or backward transmission path 162, which transmits signals from right optical line 152 to left optical line 151. Wavelengths for the forward transmission and the reverse or backward transmission are different from each other.

First (forward) optical sending-end 111 comprises a transmitter $Tx_1$ employing wavelength $\lambda_1$, and a transmitter $Tx_2$ employing wavelength $\lambda_2$. First optical receiving-end 112 for receiving signal from the first (forward) optical sending-end 111 comprises a receiver $Rx_1$ employing the wavelength $\lambda_1$, and a receiver $Rx_2$ employing the wavelength $\lambda_2$.

Second (reverse or backward) sending-end 121 comprises a transmitter $Tx_3$ employing wavelength $\lambda_3$, and a transmitter $Tx_4$ employing wavelength $\lambda_4$. Second optical receiving-end 122 for receiving signal from the second (reverse or backward) optical sending-end 121 comprises a receiver $Rx_3$ employing the wavelength $\lambda_3$, and a receiver $Rx_4$ employing the wavelength $\lambda_4$.

First optical multiplexer 131 multiplexes optical output signals of the first (forward) optical sending-end 111, and transmits the multiplexed optical output signal to the first optical receiving-end 112. The first optical multiplexer 131 demultiplexes an optical output signal of the second (reverse or backward) optical sending-end 121 and transmits the demultiplexed optical output signal to the second optical receiving-end 122.

Second optical multiplexer 132 multiplexes the optical output signal of the second (reverse or backward) optical sending-end 121 and transmits the multiplexed optical output signal to the second optical receiving-end 122. The second optical multiplexer 132 demultiplexes the optical output signal of the first (forward) optical sending-end 111 and transmits the demultiplexed optical output signal to first optical receiving-end 112.

The bidirectional optical amplifier 140 should minimize any reduction of transmission quality caused by back reflections. To configure a bidirectional amplifying apparatus for minimizing reduction of transmission quality, the following method has been suggested. The wavelength(s) of WDM optical signal, which travels forward, and the wavelength(s) of WDM optical signal, which travels in a reverse or backward direction, are allocated with different wavelengths, respectively. And, an optical filter is provided to prevent the back reflected optical signal from passing through the optical amplifier.

Figure 2:
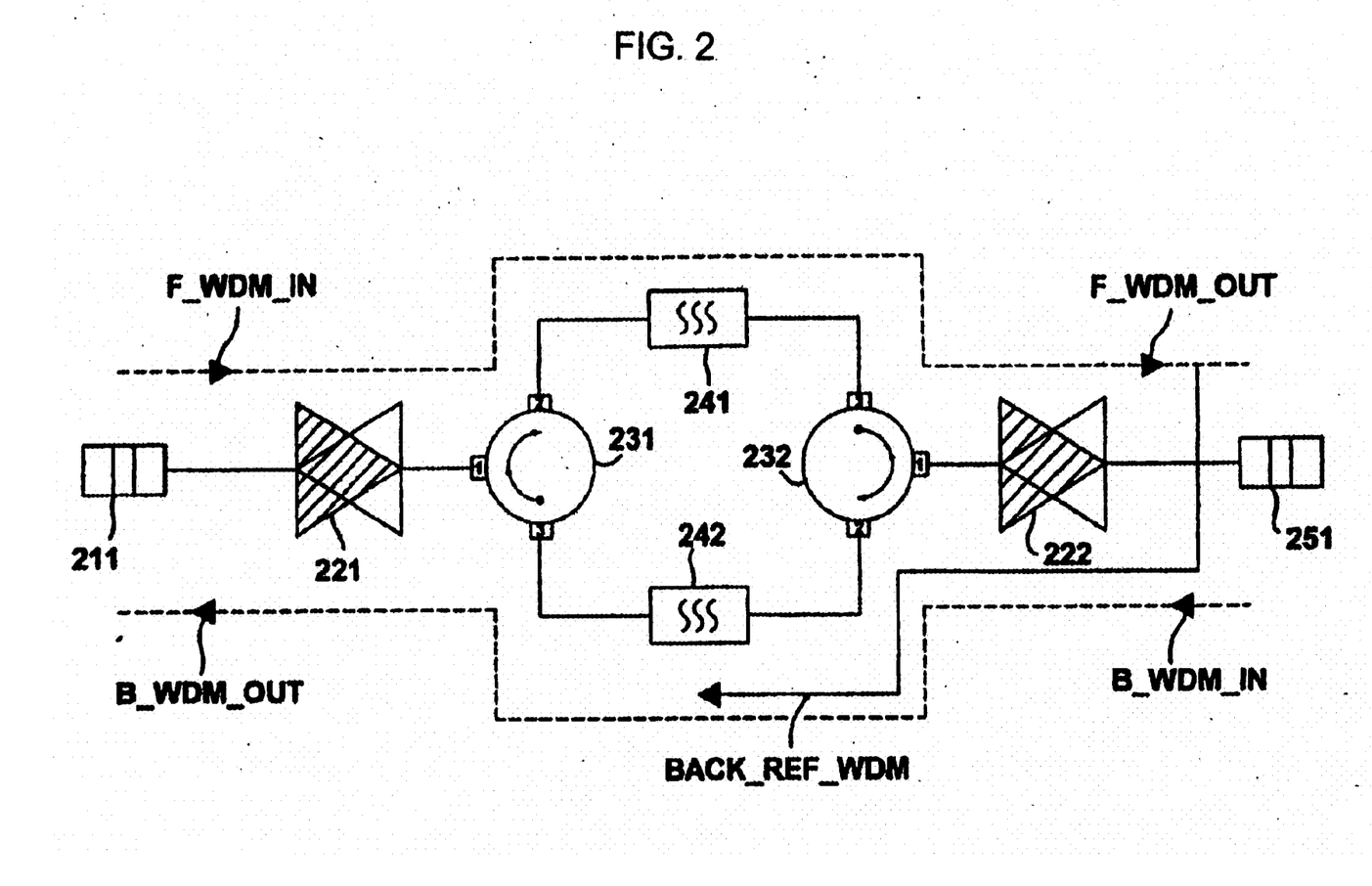
FIG. 2 is schematic diagram showing a bidirectional optical amplifying apparatus in which back reflections are removed, in a conventional optical transmission system

FIG. 2 is a schematic diagram showing a bidirectional optical amplifying apparatus in which back reflections are removed, in a conventional optical transmission system. The bidirectional optical amplifying apparatus is comprised of optical connectors 211, 251, bidirectional optical amplifier 221, 222, circulators 231, 232 and optical filters 241, 242.

The forward WDM transmission channel is comprised of the first optical connector 211, the first bidirectional optical amplifier 221, the first circulator 231, first optical filter 241, the second circulator 232, the second bidirectional optical amplifier 222, and the second optical connector 251. The reverse WDM transmission channel is comprised of the second optical connector 251, the second bidirectional optical amplifier 222, the second circulator 232, the second optical filter 242, the first circulator 231, the first bidirectional optical amplifier 221, and the first optical connector 211. Here, characteristics of the first bidirectional optical amplifier 221 and the second bidirectional optical amplifier 222 are the same.

The optical connectors 211, 251 are elements used for transmitting output signals of the bidirectional optical amplifiers 221, 222 to the optical line. The optical connectors 211, 251 have the characteristic of reflecting back some of the optical signals by forming a reflective surface at a node.

The bidirectional optical amplifiers 221, 222 are comprised of passive elements and a pump laser. The bidirectional optical amplifiers 221, 222 are designed to be capable of bidirectional amplification by removing an isolator in a conventional unidirectional optical amplifier.

The circulators 231, 232 are elements in which a unique output port is provided according to the input direction of an optical signal. For example, the circulator has the characteristic that an input signal at port 1 of the circulator should exit through port 2, and an input signal at port 3 of the circulator should exit through port 1. The other words, the output for each input port is the first port reached by rotating the ports of the circulator clockwise.

The bidirectional optical amplifying apparatus in FIG. 2 operates as follows. An input signal (F_WDM_IN) in the forward WDM transmission line is represented with a dotted line in an upper part of the FIG. 2. An input signal (R_WDM_IN) in the reverse WDM transmission line is represented with a dotted line in a lower part of the FIG. 2. The wavelengths of the two input signals (F_WDM_IN and R_WDM_IN) are different from each other.

The forward WDM optical input signal (F_WDM_IN) is amplified in the first bidirectional optical amplifier 221. The F_WDM_IN signal passes through the first optical circulator 231, the first optical filter 241, the second circulator 232, and the second bidirectional optical amplifier 222, and is output as a forward WDM optical output signal (F_WDM_OUT).

The reverse WDM optical input signal (R_WDM_IN) is amplified in the second bidirectional optical amplifier 222. The R_WDM_IN signal passes through the second circulator 232, the second optical filter 242, the first circulator 231, and the first bidirectional optical amplifier 221, and is output as a reverse WDM optical output signal (B_WDM_OUT).

Here, the forward WDM optical output signal (F_WDM_OUT) is back reflected by the second optical connector 251 so that the back reflected WDM optical signal (BACK_REF_WDM) is produced. The BACK_REF_WDM signal passes through the second bidirectional optical amplifier 222 and travels through the second circulator 232 to the second optical filter 242. The second optical filter 242 is designed to pass the reverse signal and cut off the forward signal. Therefore, the second optical filter 242 filters the BACK_REF_WDM such that it does not pass through the filter to the first bidirectional optical amplifier 221.

Also, the reverse WDM optical output signal (not shown) is back reflected by the first optical connector 211 so that a back reflected WDM optical signal is produced. Although it passes through the first bidirectional optical amplifier 221 and travels through the first circulator 231 to the first optical filter 241, the back reflected WDM optical signal is cut off by the first optical filter 241.

In this way, the back reflected optical signal in the bidirectional optical transmission is cut off by the filter, thereby preventing a reduction in efficiency caused by back reflections.

Figure 3A:
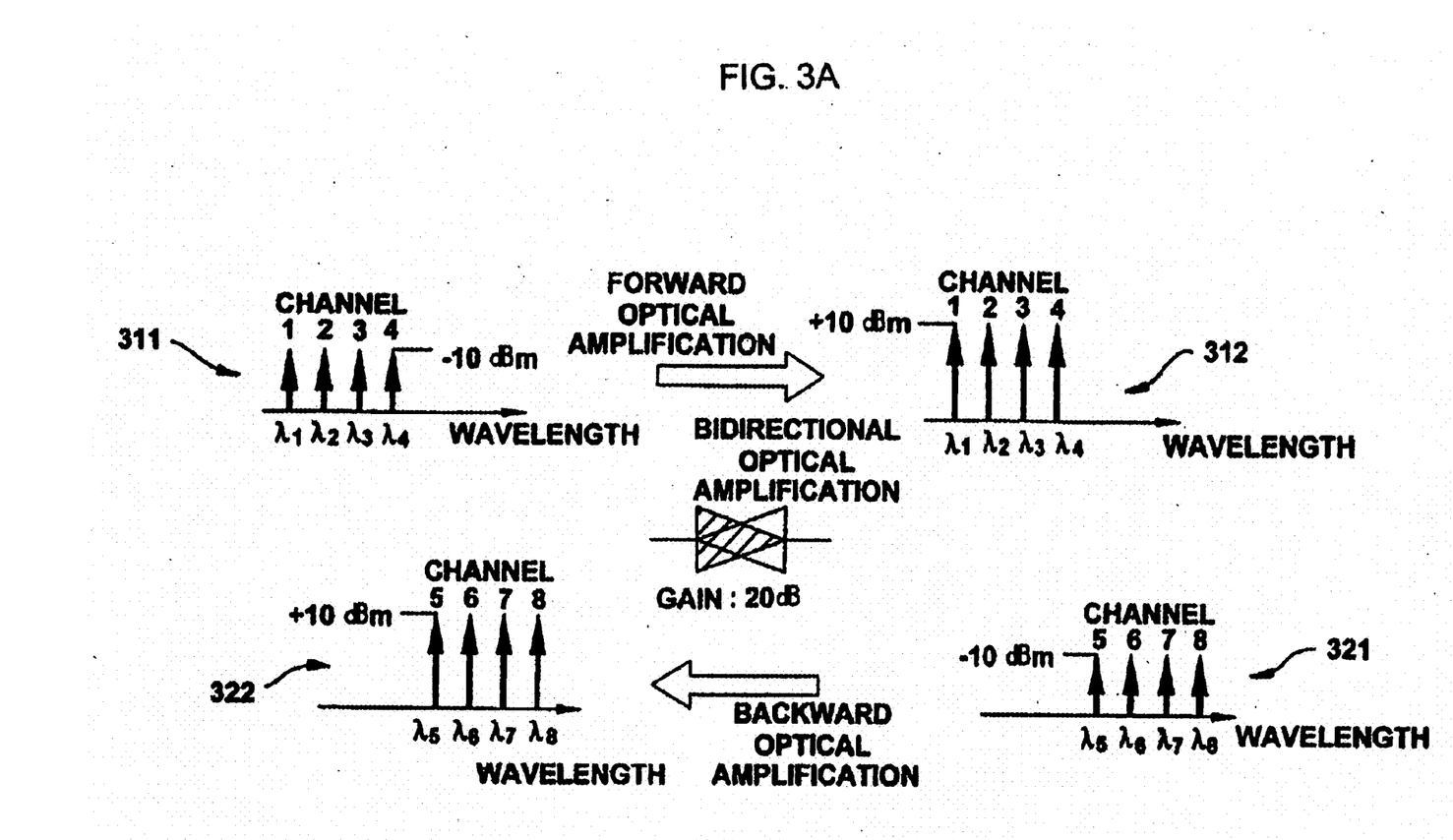
FIG. 3A is graph showing an input-output gain of the bidirectional optical amplifier of FIG. 2, in a normal state.
Figure 3B:
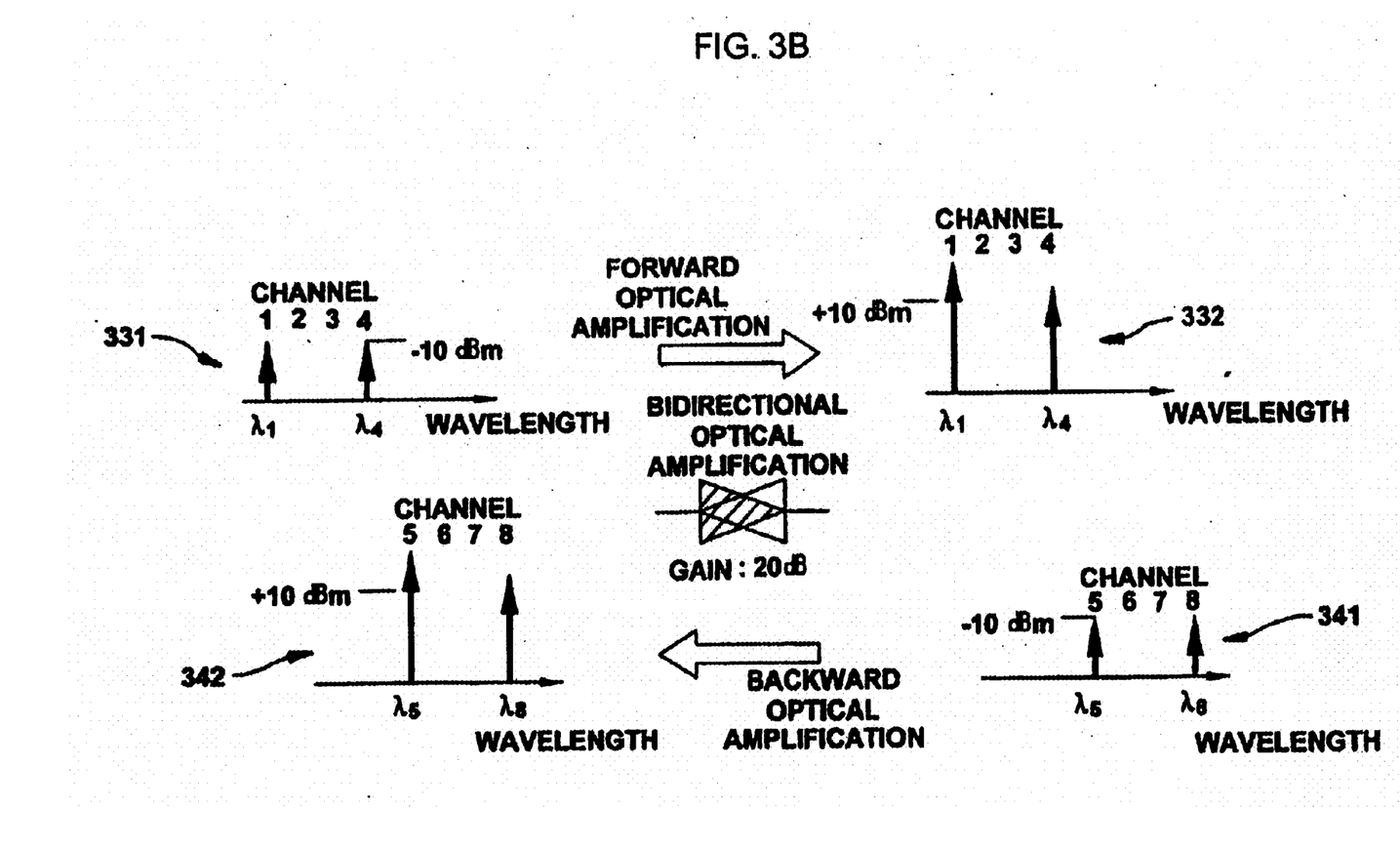
FIG. 3B is graph showing an input-output gain of the bidirectional optical amplifier in FIG. 2 when the channel is branched.

But, the conventional bidirectional optical amplifying apparatus in FIG. 2 has disadvantage in that the amplifying apparatus cannot overcome a variation of optical gain which occurs in the bidirectional optical amplifier when coupling/dividing a WDM channel. Such a situation is illustrated with reference to FIG. 3.

FIG. 3A is a graph showing an input-output gain of the bidirectional optical amplifier of FIG. 2, in a normal state. FIG. 3B is a graph showing an input-output gain of the bidirectional optical amplifier in FIG. 2 when the channel is branched off. We consider a case where the gain of the bidirectional optical amplifier is 20 dB, and the input signal has four (4) forward and four (4) reverse channels having different wavelengths, respectively.

Referring to FIG. 3A, four channels $\lambda_1$, $\lambda_2$, $\lambda_3$, $\lambda_4$ of a forward WDM optical input signal 311, and four channels $\lambda_5$, $\lambda_6$, $\lambda_7$, $\lambda_8$ of a reverse WDM optical input signal 321 have the same optical intensity (for example, −10 dBm). When the input signal of each direction is input to the bidirectional optical amplifier, each channel of the forward WDM optical output signal 312 and reverse WDM optical output signal 322 maintains the same intensity (for example, +10 dBm) in a normal state, as shown in FIG. 3A.

FIG. 3B shows the case where the second and third channels $\lambda_2$, $\lambda_3$ of a forward WDM optical input signal 331 and sixth and seventh channels $\lambda_6$, $\lambda_7$ of a reverse WDM optical input signal 341 are branched off. The optical intensity of each channel $\lambda_1$, $\lambda_4$ of the forward WDM optical output signal 332 and each channel $\lambda_5$, $\lambda_8$ of the reverse WDM optical output signal 342 increases non-linearly (for example, exceeds +10 dBm).

So when a WDM channel is branched off, the optical output intensity of the other WDM channels increases abnormally. Such an increase of optical intensity introduces a nonlinear effect; and the difference of the optical intensity makes the transmission quality of each channel different. This is one of the factors making network management difficult.

On the other hand, when the WDM channel is coupled, the optical output intensity of the other WDM channels decreases and the transmission quality falls off.

Accordingly, it is required to develop a bidirectional optical amplifier for maintaining the optical gain of the other WDM channel within a certain range, maintaining the gain flatness of each channel, although coupling/branching of other WDM channels occurs.

SUMMARY OF THE INVENTION

Accordingly, the present invention is directed to a bidirectional optical amplifying apparatus and optical gain controlling method in a bidirectional WDM optical communication network that substantially obviates one or more of the problems due to limitations and disadvantages of the related art.

An object of the present invention is to control the energy source of an optical amplifier according to the variation of a WDM channel transmitted through a bidirectional optical amplifier in a bidirectional WDM optical communication network. The present invention provides a bidirectional optical amplifying apparatus and an optical gain controlling method in the bidirectional WDM optical communication network which maintains optical gain and gain flatness of respective channels in the bidirectional optical amplifier uniformly, in spite of coupling and branching off of one or more channels.

In one embodiment, the present invention provides an optical amplifying apparatus amplifying an input optical signal to a predetermined level according to the optical output of a pump laser, and outputting the amplified optical signal in a bidirectional WDM (wavelength division multiplexing) optical communication network, the optical amplifying apparatus comprising:

control means for controlling the optical output of the pump laser according to the variation of WDM channel transmitted through the bidirectional optical communication network, and uniformly maintaining the transmission gain of the bidirectional optical communication network.

In another embodiment, the present invention provides an optical amplifying apparatus for amplifying an optical signal of a WDM channel input from a bidirectional WDM optical communication network in two directions to a predetermined level according to an optical output of a pump laser, and outputting the amplified optical signal in a bidirectional WDM optical communication network, the optical amplifying apparatus comprising:

control means for detecting the optical signal, transmitted through the bidirectional optical communication network, determining a variation of the WDM channel (i.e., through branching or coupling of one or more WDM channels), controlling the optical output according to the determination, and maintaining a transmission gain of the bidirectional optical communication network, uniformly.

In yet another embodiment, the present invention provides an optical gain controlling method of a optical amplifying apparatus amplifying an optical signal of a WDM channel to a predetermined level according to an optical output of a pump laser and outputting the amplified optical signal in a WDM optical communication network, comprising the steps of:

i) detecting an input and output WDM optical signal in the optical amplifying apparatus; and ii) compensating gain error of the optical amplifying apparatus caused by a WDM channel variation, using the WDM optical signal input and the WDM optical signal output.

In a further embodiment, the present invention provides a method for controlling the optical gain of a WDM optical amplifying apparatus amplifying an optical signal of a WDM channel to a predetermined level according to an optical output of a pump laser and outputting the amplified optical signal in a bidirectional WDM optical communication network, comprising the steps of:

detecting a forward WDM optical signal and a backward or reverse WDM optical signal input and output in two directions, respectively; and compensating the gain error of the bidirectional optical amplifying apparatus caused by a WDM channel variation, using the detected bidirectional WDM optical signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 4:
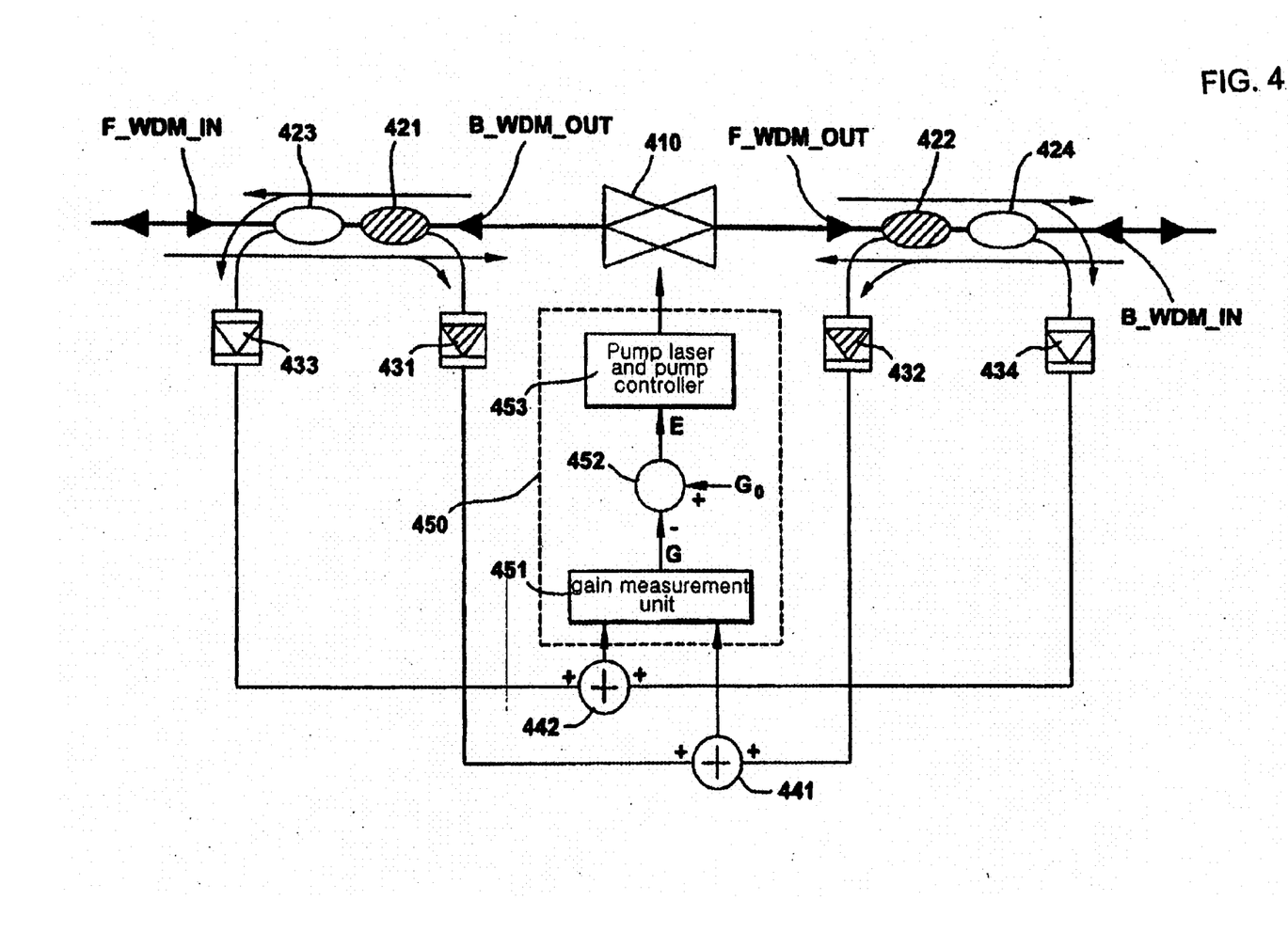
FIG. 4 illustrates one embodiment of a bidirectional optical amplifying apparatus according to the present invention.
Figure 5:
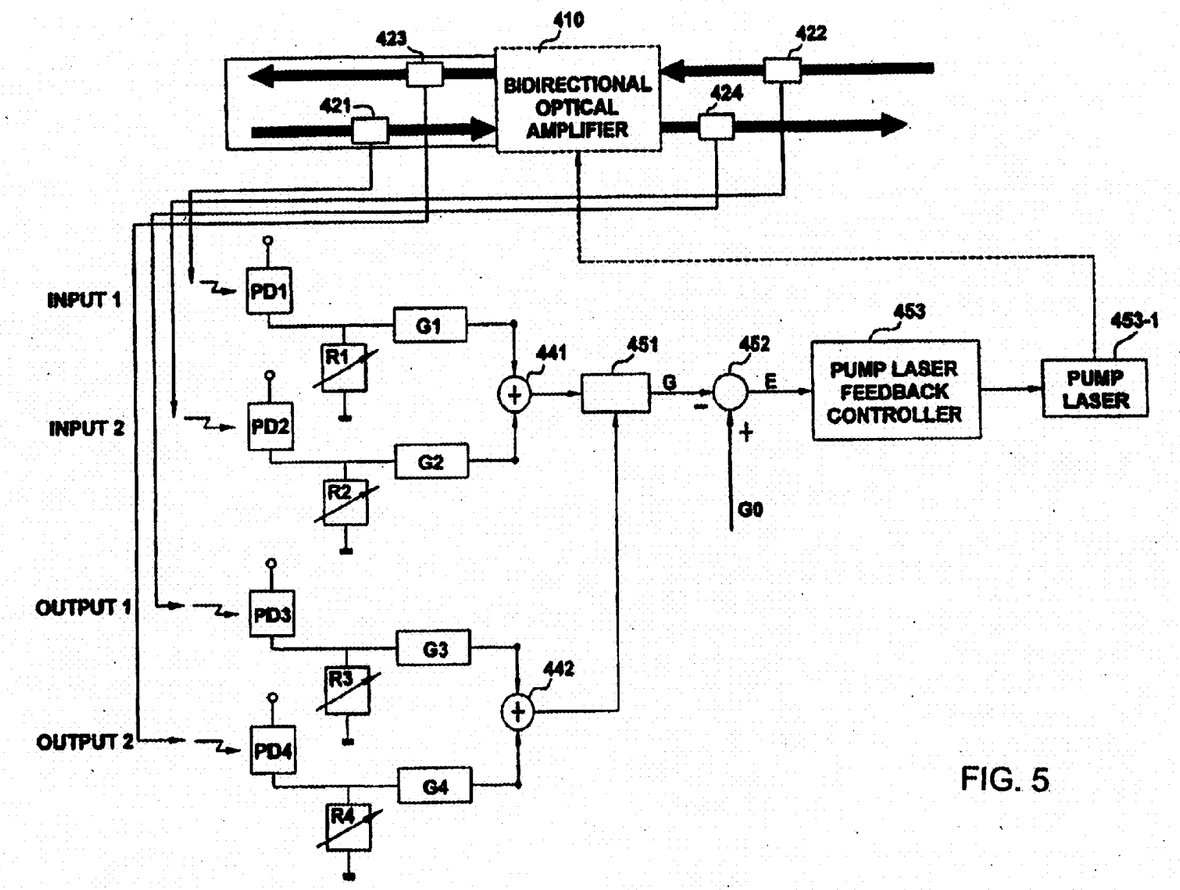
FIG. 5 illustrates an exemplary configuration of a bidirectional optical amplifying apparatus according of the present invention.

FIG. 4 illustrates one embodiment of a bidirectional optical amplifying apparatus. FIG. 5 illustrates an exemplary configuration of a bidirectional optical amplifying apparatus.

Briefly, the bidirectional optical amplifying apparatus of FIG. 4 includes: a bidirectional optical amplifier 410; an optical signal measurement unit comprising tap couplers 421–424, optical receiving ends 431–434, and optical addition units 441 and 442 for measuring the total input intensity and the total output intensity of a bidirectional optical signal in the bidirectional optical amplifier; and feedback control circuitry 450, for calculating gain error from a predetermined reference gain after calculating the gain of the bidirectional optical amplifier with the total input intensity and the total output intensity of the bidirectional optical signal, and for providing feedback for controlling the transmission gain of the bidirectional optical communication network according to the calculated gain error.

The bidirectional optical amplifier 410 amplifies a forward WDM optical input signal (F_WDM_IN) and a backward or reverse WDM optical input signal (B_WDM_IN) and then transmits them to each optical fiber. The bidirectional optical amplifier may have various structures, and may be typically the same as FIG. 2.

The optical signal measurement unit may include input tap couplers 421, 422, output tap couplers 423, 424, optical input receiving-ends 431, 432, optical output receiving-ends 433, 434, an optical input addition unit 441, and an optical output addition unit 442. The input tap couplers 421, 422 divide a forward WDM optical signal and a reverse or backward WDM optical signal, input to the bidirectional optical amplifier at a constant ratio, and branch some of the WDM optical signal from the bidirectional optical communication network. The output tap couplers 423, 424 divide the forward WDM optical signal and the reverse WDM optical signal, output from the bidirectional optical amplifier, at a constant ratio, and branch some of the WDM optical signal from the bidirectional optical communication network. The optical input receiving-ends 431, 432 receive some of the branched forward WDM optical signal and the branched reversed WDM optical signal, respectively from the input tap couplers 421, 422, and measure the intensity of the optical signal input in bidirection. The optical output receiving-ends 433, 434 receive some of the branched forward WDM optical signal and the branched reverse WDM optical signal, respectively from the output tap couplers 423, 424, and measure the intensity of the bidirectional optical output signal output in bidirection. The optical input addition unit 441 adds the output signals of each optical input receiving-end, and calculates the total intensity of the optical input signal input in bidirection. The optical output addition unit 442 adds the output signals of each optical output receiving-end and calculates the total intensity of the optical output signal output in bidirection.

At the left side of the optical fiber, the first input tap coupler 421 divides the WDM optical signal, input to the bidirectional optical amplifier 410, in a predetermined ratio (for example, 99:1) and branches the divided WDM optical signals to two optical fibers, respectively. At the right side of the optical fiber, the second input tap coupler 422 divides the WDM optical signals input to the bidirectional optical amplifier 410, in a predetermined ratio (for example, 99:1), and branches the divided WDM optical signals to two optical fibers, respectively., One of the divided optical signals having most of the energy (e.g., 99%) is transmitted to the input of the optical amplifier 410 and, the other optical signal having a small fraction of energy (e.g., 1%) is transmitted to the optical input receiving-ends 431, 432 in order to measure the intensity of the input signal, respectively.

The first output tap coupler 423 divides the left optical output signal of the bidirectional optical amplifier 410 in a predetermined ratio (for example, 99:1) and branches the optical signals to two optical fibers. The second output tap coupler 424 divides the right optical output signal of the bidirectional optical amplifier 410 in a predetermined ratio (for example, 99:1) and branches the optical signals to two optical fibers. One part of the divided optical signal having most of the energy (e.g., 99%) is transmitted to the optical fiber for communication, and the other part of the optical signal having a small fraction of energy (e.g., 1%) is transmitted to the optical output receiving-ends 433, 434 in order to measure the intensity of the output signal, respectively.

Each of the optical receiving-ends 431, 432, 433, 434 converts the optical signal (e.g., 1%) branched from each of the tap couplers 421, 422, 423, 424, respectively, to an electrical signal. The optical receiving-ends 431–435 preferably may include optical diodes PD1–PD4, variable resistors R1–R4, and electrical amplifiers G1–G4, respectively, as in the embodiment of FIG. 5. The optical diodes PD1–PD4 output current produced by the respective optical signals, variable resistors R1–R4 each control the respective currents, and the electrical amplifiers G1–G4 maintain a balance of monitoring/controlling signals in the optical amplifier.

Feedback control circuitry 450 measures an optical gain (G) of the optical amplifier 410 with use of the electrical signal transmitted from the optical receiving-end. Then the feedback control circuitry 450 compares the measured optical gain with a predetermined optical gain ($G_0$) and controls the pump laser to minimize the error (E) between G and $G_0$.

The feedback control circuitry 450 preferably may include a gain measurement unit 451 for calculating gain of the bidirectional optical amplifier by using of the output of the optical input addition unit 441 and the optical output addition unit 442, a gain comparing unit 452 for comparing the calculated gain with a reference gain and calculating a gain error, and a pump laser control unit 453 for controlling the optical output of the pump laser 453-1 according to the calculated gain error.

In another embodiment of the present invention, the present invention may be applied to a unidirectional optical communication network. So the present invention may be applied to a feedback control of the unidirectional optical amplifier by measuring the optical input signal and the optical output signal.

Figure 6:
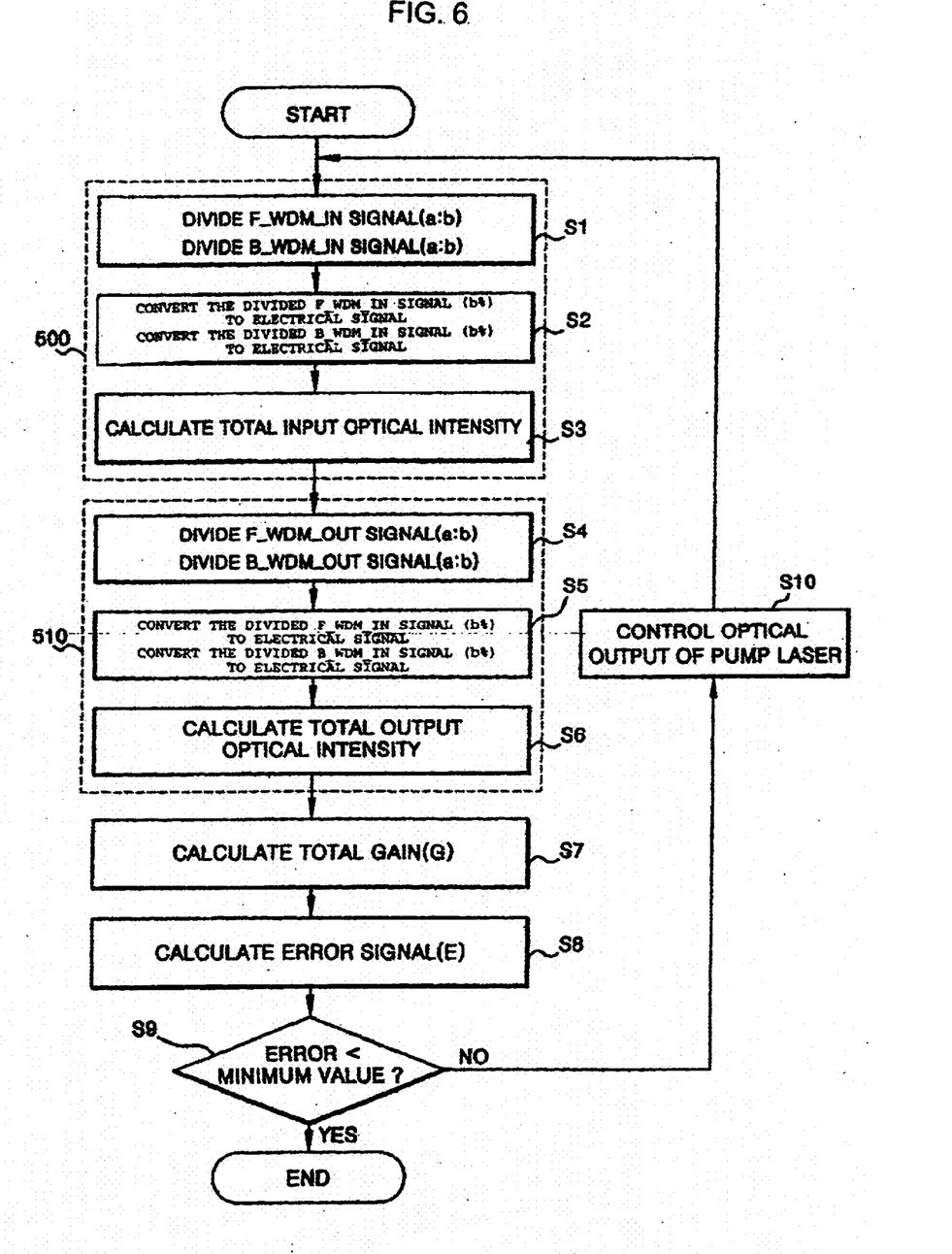
FIG. 6 is an exemplary flowchart showing an optical gain controlling method of a bidirectional optical -amplifying apparatus according to the present invention.

FIG. 6 is an exemplary flowchart showing a method of controlling the optical gain of a bidirectional optical amplifying apparatus. The optical gain controlling method may comprise optical signal detecting steps (S1–S6) for detecting the intensity of a forward WDM optical signal and a reverse WDM optical signal which are input or output from the bidirectional WDM optical communication network to the bidirectional optical amplifier in each direction, respectively, and optical gain compensating steps (S7–S10) for compensating the gain error of the bidirectional optical amplifier caused by WDM channel variations using the detected bidirectional WDM optical signal.

The optical signal detecting steps may comprise: dividing an input signal of the bidirectional WDM optical signal in the bidirectional optical amplifier in a constant ratio (a:b) and branching some of the bidirectional WDM optical signal from the optical communication network (S1); converting the branched forward WDM optical input signal and the branched reverse WDM optical input signal to electrical signals, respectively, and detecting the input intensity of the bidirectional WDM optical signal respectively (S2); calculating the total input intensity of the bidirectional WDM optical signal by adding the detected forward WDM optical input signal and the detected reverse WDM optical input signal (S3); dividing the output of the bidirectional WDM optical signal from the bidirectional WDM optical amplifier in a constant ratio (a:b), and branching some of the bidirectional.WDM optical signal from the optical communication network (S4); converting the branched forward WDM optical output signal and the branched reverse WDM optical output signal to electrical signals, respectively, and detecting the output intensity of the bidirectional WDM optical signal, respectively (S5); and calculating the total output intensity of the bidirectional WDM optical signal by adding the detected forward WDM optical output signal and the detected reverse WDM optical output signal (S6).

The step of calculating the total optical input intensity (dotted block; 500) and the step of calculating the total optical output intensity (dotted block; 510) may be independently performed out of order.

The optical gain compensating steps preferably may comprise calculating the optical gain of the bidirectional amplifier with the total input intensity and the total output intensity of the calculated bidirectional WDM optical signal (S7); comparing the calculated optical gain (G) with a predetermined reference gain ($G_0$) and detecting the gain error (E) of the bidirectional optical amplifier according to WDM input channel variation (S8); and controlling the optical output of the pump laser according to the gain error (E) (S10).

The optical signal detecting step and the optical gain compensating step can further include a step (S9) for comparing the detected gain error (E) with the predetermined minimum value and selectively carrying out the step of controlling the optical output of the pump laser according to the comparing result. The step S9 may be repeatedly performed until the gain error (E) of the bidirectional optical amplifier becomes less than a predetermined minimum value.

Now, referring to FIG. 4 through FIG. 6, the operation and effect of the present embodiment are explained.

Referring to FIG. 6, a forward WDM optical input signal (F_WDM_IN) and a reverse WDM optical input signal (B_WDM_IN) of the bidirectional optical amplifier 410 are respectively divided by the input tap couplers 421, 422 in a constant ratio (e.g., 99:1). The divided 1% signal is respectively transmitted to the optical input receiving-ends 431, 432 (S1). The optical input receiving-ends 431, 432 convert the received optical signals to electrical signals, and the converted electrical signals are transmitted to the optical input addition unit 441 of the feedback control circuitry 450 (S2). The optical input addition unit 441 adds two received electrical signals and calculates a total optical input intensity of the optical amplifier 410 (S3).

The forward WDM optical output signal (F_WDM_OUT) and the reverse WDM optical output signal (B_WDM_OUT) of the bidirectional optical amplifier 410 are divided by each of the output tap couplers 424, 423 in a constant ratio (99:1). The smaller divided signals (e.g., 1% of the output signal) are respectively transmitted to the optical output receiving-ends 434, 433 (S4). The optical output receiving-ends 434, 433 convert the received optical signals to electrical signals and transmit them to the optical output addition unit 442 (S5). The optical output addition unit 442 adds two received electrical signals and calculates the total optical output intensity of the optical amplifier 410 (S6).

Here, steps (S1,S2, and S3) for calculating the total optical input intensity are represented in the dotted block (500) and steps (S4, S5, and S6) for calculating the total optical output intensity are also represented in dotted block (510). The processes of the blocks 500 and 510 are independent from each other, so they can be performed out of order.

The gain measurement unit 451 of the feedback control circuitry 450 calculates total gain (G) of the optical amplifier by comparing the total input intensity of the input optical addition unit 441 and the total output intensity of the output optical addition unit 442 (S7).

The gain comparing unit 452 compares the gain (G) calculated in the gain measurement unit 451, with the predetermined gain ($G_O$) and calculates an error signal (E) (S8).

The pump laser and the pump controller 453 of the feedback control circuitry control an optical output of the pump laser through the error signal (E), such that gain of the bidirectional optical amplifier may be controlled (S10). Steps S1–S10 are repeatedly performed until the error signal is minimized.

As a result, optical gain of a channel is prevented from being increased and maintains the optical gain uniformly, even if the total optical input of the optical amplifier decreases due to branching of one or more WDM channels. Also, the optical gain of a channel is prevented from being increased due to coupling of one or more WDM channels, maintaining the optical gain uniformly. So transmission quality is maintained.

As mentioned above, in case that the WDM branching/coupling happens, the present invention can uniformly maintain the optical amplifier gain by automatically performing feedback control processes, even if the optical gain increases/decreases. The feedback control circuitry of the present invention can be independently applied to the configuration of the optical amplifier. Because control stability in feedback control is high as well the present invention can provide a reliable optical amplifying apparatus. Additionally, the present invention may be adapted to configuration of a unidirectional optical communication network. Also, the present invention provides convenience of configuration and maintenance management in the bidirectional WDM optical communication network.

It will be apparent to those skilled in the art that various modifications and variation can be made in the bidirectional optical amplifying apparatus and optical gain controlling method in bidirectional WDM optical communication network of the present invention without departing from the spirit or scope of the invention. Thus, it is intended that the present invention cover the modifications and variations of this invention provided they come within the scope of the appended claims and their equivalents.

What is claimed is:

1. In a bidirectional WDM (wavelength division multiplexing) optical communication network, an optical amplifying apparatus for amplifying an optical input signal to a predetermined level according to an optical output of a pump laser, and outputting an amplified optical output signal, said optical amplifying apparatus comprising:
   a bidirectional optical amplifier for amplifying a forward WDM optical input signal and a backward WDM optical input signal, and outputting an amplified forward WDM optical output signal and an amplified backward WDM optical output signal, respectively;
   an optical signal measurement means for measuring a total input intensity of the optical input signal to the optical amplifying apparatus by adding the forward WDM optical input signal and the backward WDM optical input signal, and for measuring a total output intensity of the optical output signal from the optical amplifying apparatus by adding the forward WDM optical output signal and the backward WDM optical output signal; and
   a control means for calculating an optical gain from the total input intensity and the total output intensity, and feedback-controlling a transmission gain of the bidirectional WDM optical communication network by controlling the output of the pump laser according to the calculated optical gain, and thereby uniformly maintaining the transmission gain of the bidirectional WDM optical communication network.

2. The optical amplifying apparatus according to claim 1, wherein the optical signal measurement means comprises:
   input branching means for dividing in a constant ratio the optical input signal input to the optical amplifying apparatus and branching a portion of the optical input signal from the bidirectional WDM optical communication network;
   input receiving means for receiving the branched portion of the optical input signal from the input branching means, and measuring an intensity of the branched portion of the optical input signal;
   output branching means for dividing in a constant ratio the optical output signal output from the optical amplifying apparatus, and branching a portion of the optical output signal from the bidirectional WDM optical communication network;
   output receiving means for receiving the branched portion of the optical output signal from the output branching means and measuring an intensity of the branched portion of the optical output signal;
   optical input addition means for adding outputs of the input receiving means and calculating the total input intensity of the optical input signal input to the optical amplifying apparatus; and
   optical output addition means for adding outputs of the output receiving means and calculating the total output intensity of the optical output signal output from the optical amplifying apparatus.

3. The optical amplifying apparatus according to claim 2, wherein the input receiving means and output receiving means comprise:
   optical diodes emitting electric current according to optical signal;
   variable resistors for controlling volume of electricity; and
   electrical amplifiers for maintaining a balance of monitoring/controlling signals.

4. The optical amplifying apparatus according to claim 1, wherein the control means comprises:
   gain calculating means for calculating the optical gain of the optical amplifying apparatus from the total input intensity and the total output intensity;
   gain comparing means for comparing the calculated optical gain with a predetermined reference gain and calculating a gain error;
   pump laser control means for controlling the transmission gain of the optical amplifying apparatus according to the gain error.

5. In a bidirectional WDM optical communication network, a bidirectional optical amplifying apparatus for amplifying a bidirectional optical input signal of a WDM channel, input from the bidirectional WDM optical communication network in forward and backward directions, to a predetermined level according to an optical output of a pump laser, and outputting an amplified bidirectional optical output signal, the bidirectional optical amplifying apparatus comprising:
   a bidirectional optical amplifier for amplifying a forward WDM optical input signal and a backward WDM optical input signal, and outputting an amplified forward WDM optical output signal and an amplified backward WDM optical output signal, respectively;
   an optical signal measurement means for measuring a total input intensity of the bidirectional optical input signal to the bidirectional optical amplifying apparatus by adding the forward WDM optical input signal and the backward WDM optical input signal, and for measuring a total output intensity of the bidirectional optical output signal from the bidirectional optical amplifying apparatus by adding the forward WDM optical output signal and the backward WDM optical output signal; and
   a control means for determining a variation of the WDM channel due to a branching or coupling of the WDM channel by calculating an optical gain from the total input intensity and the total output intensity, controlling a level of the bidirectional optical output signal according to the determination, and thereby uniformly maintaining a transmission gain of the bidirectional WDM optical communication network.

6. The bidirectional optical amplifying apparatus according to claim 5, wherein the control means comprises:
   gain calculating means for calculating the optical gain of the bidirectional optical amplifying apparatus from the total input intensity and the total output intensity;
   gain comparing means for comparing the calculated optical gain with a reference gain and calculating a gain error; and
   pump laser control means for controlling the optical output of the pump laser to be supplied to the bidirectional optical amplifying apparatus according to the calculated gain error.

7. The bidirectional optical amplifying apparatus according to claim 5, wherein the optical signal measurement means comprises:
   forward input branching means and backward input branching means for dividing in a constant ratio a forward WDM optical input signal and a backward WDM optical input signal, each input to the bidirectional optical amplifying apparatus, and branching a portion of the bidirectional optical input signal from the bidirectional WDM optical communication network;
   forward input receiving means and backward input receiving means for receiving the branched portion of the forward WDM optical input signal and the branched portion of the backward WDM optical input signal, respectively, from the input branching means and measuring an intensity of the forward WDM optical input signal and the backward WDM optical input signal, respectively;
   forward output branching means and backward output branching means for dividing in a constant ratio a forward WDM optical output signal and a backward WDM optical output signal, each output from the bidirectional optical amplifying apparatus, and branching a portion of the bidirectional optical output signal from the bidirectional WDM optical communication network;
   forward output receiving means and backward output receiving means for receiving the branched portion of the forward WDM optical output signal and the backward WDM optical output signal, respectively, from the output branching means and measuring an intensity of the forward WDM optical output signal and the backward WDM optical output signal, respectively;
   bidirectional optical input addition means for adding each output of the forward and backward input receiving means and calculating the total input intensity of the bidirectional optical input signal; and
   bidirectional optical output addition means for adding each output of the forward and backward output receiving means and calculating the total output intensity of the bidirectional optical output signal.

8. The optical amplifying apparatus according to claim 7, wherein the forward and backward input receiving means and forward and backward output receiving means comprise:
   optical diodes emitting electric current according to the optical signal;
   variable resistors for controlling volume of electricity; and
   electrical amplifiers for maintaining a balance of monitoring/controlling signals.

9. In a bidirectional WDM optical communication network, a method of controlling an optical gain of a bidirectional WDM optical amplifying apparatus amplifying a bidirectional WDM optical signal of a WDM channel to a predetermined level according to an optical output of a pump laser and outputting an amplified bidirectional WDM optical signal, the method comprising:
   dividing, in a constant ratio, forward WDM optical input signal and backward WDM optical input signal, and dividing, in a constant ratio, forward WDM optical output signal and backward WDM optical output signal in the bidirectional WDM optical amplifying apparatus and branching a portion of the bidirectional WDM optical signal from the optical communication network;
   converting the branched forward WDM optical input signal, the branched forward WDM optical output signal, the branched reverse WDM optical input signal, and the branched reverse WDM optical output signal to an electrical signal respectively;
   detecting a forward WDM optical input signal and a backward WDM optical input signal, and detecting a forward WDM optical output signal and a backward WDM optical output signal;
   calculating a total input intensity and a %total output intensity of the bidirectional WDM optical signal by adding the detected forward WDM optical input signal to the detected backward WDM optical input signal, and by adding the detected forward WDM optical output signal to the detected backward WDM optical output signal respectively; and compensating a gain error of the bidirectional WDM optical amplifying apparatus caused by a variation in the WDM channel, using the detected forward WDM optical input signal, the detected backward WDM optical input signal, the detected forward WDM optical output signal and the detected backward WDM optical output signal.

10. The method according to claim 9, wherein compensating a gain error of the bidirectional WDM optical amplifying apparatus caused by the WDM channel variation, comprises:

calculating an optical gain of the bidirectional WDM optical amplifying apparatus from the total input intensity and the total output intensity;

detecting the gain error of the bidirectional WDM optical amplifying apparatus caused by the variation of the WDM channel using the calculated optical gain; and compensating the detected gain error by controlling an optical output of the pump laser.

11. The method according to claim 10, wherein compensating a gain error of the bidirectional optical amplifying apparatus caused by the WDM channel variation includes:

calculating a difference between the calculated optical gain and a predetermined reference gain in the bidirectional WDM amplifying apparatus; and detecting the gain error caused by the variation in the WDM channel.

12. The method according to claim 10, wherein compensating a gain error of the bidirectional WDM optical amplifying apparatus caused by the variation in the WDM channel, further includes:

comparing the detected gain error with a predetermined minimum value; and selectively controlling the optical output of the pump laser according to the comparing result.

13. The method according to claim 12, wherein detecting the forward WDM optical input signal and the backward WDM optical input signal, and detecting the forward WDM optical output signal and the backward WDM optical output signal, and compensating the gain error of the bidirectional WDM optical amplifying apparatus caused by the variation in the WDM channel, are repeatedly performed until the gain error of the optical amplifying apparatus becomes the predetermined minimum value.

* * * * *